United States Patent
Biermann et al.

(10) Patent No.: US 6,974,564 B2
(45) Date of Patent: Dec. 13, 2005

(54) METHOD FOR THE REMOVAL OF MERCURY FROM A GAS STREAM

(75) Inventors: Joseph Jan Biermann, Apeldoorn (NL); Nicolaas Voogt, Beekbergen (NL)

(73) Assignee: CDEM Holland B.V. (NL)

( * ) Notice: Subject to any disclaimer, the term of this patent is extended or adjusted under 35 U.S.C. 154(b) by 323 days.

(21) Appl. No.: 10/149,946

(22) PCT Filed: Jan. 23, 2002

(86) PCT No.: PCT/NL02/00052

§ 371 (c)(1),
(2), (4) Date: Oct. 22, 2002

(87) PCT Pub. No.: WO02/058823

PCT Pub. Date: Aug. 1, 2002

(65) Prior Publication Data

US 2003/0103882 A1 Jun. 5, 2003

(30) Foreign Application Priority Data

Jan. 26, 2001 (NL) .............................. 1017206

(51) Int. Cl.$^7$ .............................. B01J 8/00; B01J 20/10; B01J 20/16
(52) U.S. Cl. ........................ 423/210; 502/411; 502/414
(58) Field of Search .......................... 423/210; 502/411, 502/414

(56) References Cited

U.S. PATENT DOCUMENTS

| | | | |
|---|---|---|---|
| 4,101,631 A | * | 7/1978 | Ambrosini et al. ......... 423/210 |
| 4,474,896 A | * | 10/1984 | Chao ......................... 502/216 |
| 5,306,475 A | | 4/1994 | Fichtel et al. |
| 5,352,647 A | * | 10/1994 | Suchenwirth ............... 502/417 |
| 5,387,738 A | * | 2/1995 | Beckham et al. ........... 588/256 |
| 6,372,187 B1 | * | 4/2002 | Madden et al. ............. 422/171 |
| 6,533,842 B1 | * | 3/2003 | Maes et al. .................... 95/134 |

FOREIGN PATENT DOCUMENTS

| | | |
|---|---|---|
| DE | 4339777 A1 | 5/1995 |
| EP | 0479350 A1 | 4/1992 |
| WO | WO-00/09256 A1 | 2/2000 |

* cited by examiner

Primary Examiner—Stanley S. Silverman
Assistant Examiner—Jonas N. Strickland
(74) Attorney, Agent, or Firm—Akerman Senterfitt

(57) ABSTRACT

The present invention relates to a method for the removal of mercury from a gas stream. The method is characterized in that at a temperature above 170° C. the gas stream is contacted with a sorbent that as the active component is comprised of a mixture of substantially silica-alumina compounds and/or calcium compounds. According to a preference, the sorbent is kaolin, that may or may not be in the dehydrated form of meta-kaolin and is optionally obtained by thermal conversion of a material chosen from paper waste or residue from the paper industry. By this method it is possible to remove mercury at temperatures higher than room temperature.

The invention also relates to a method for the removal of mercury from a gas stream, wherein the gas stream is contacted with a sorbent at a temperature above 50° C., which sorbent comprises as active substance a mixture of substantially silica-alumina compounds and/or calcium compounds, as well as with an oxidator. The invention also relates to a mercury-comprising sorbent obtained by this method and products manufactured therewith.

21 Claims, 2 Drawing Sheets

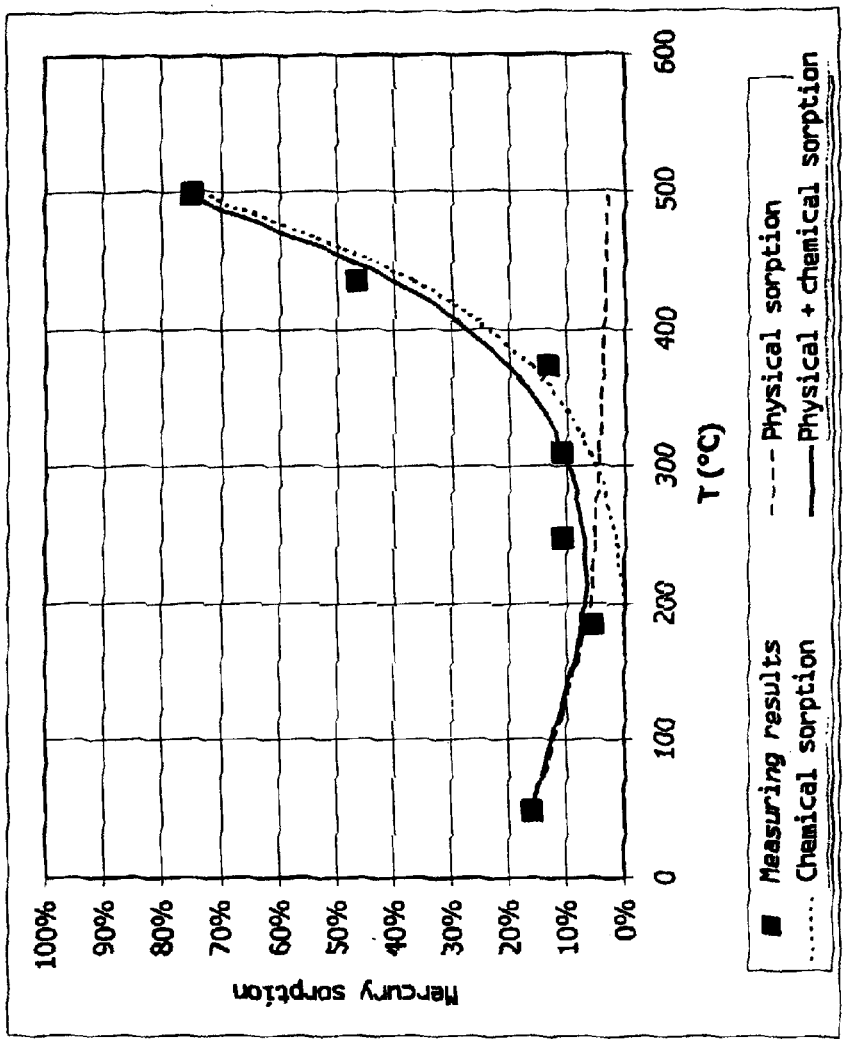
Figure 1: Graphical representation of the results from the performed experiments

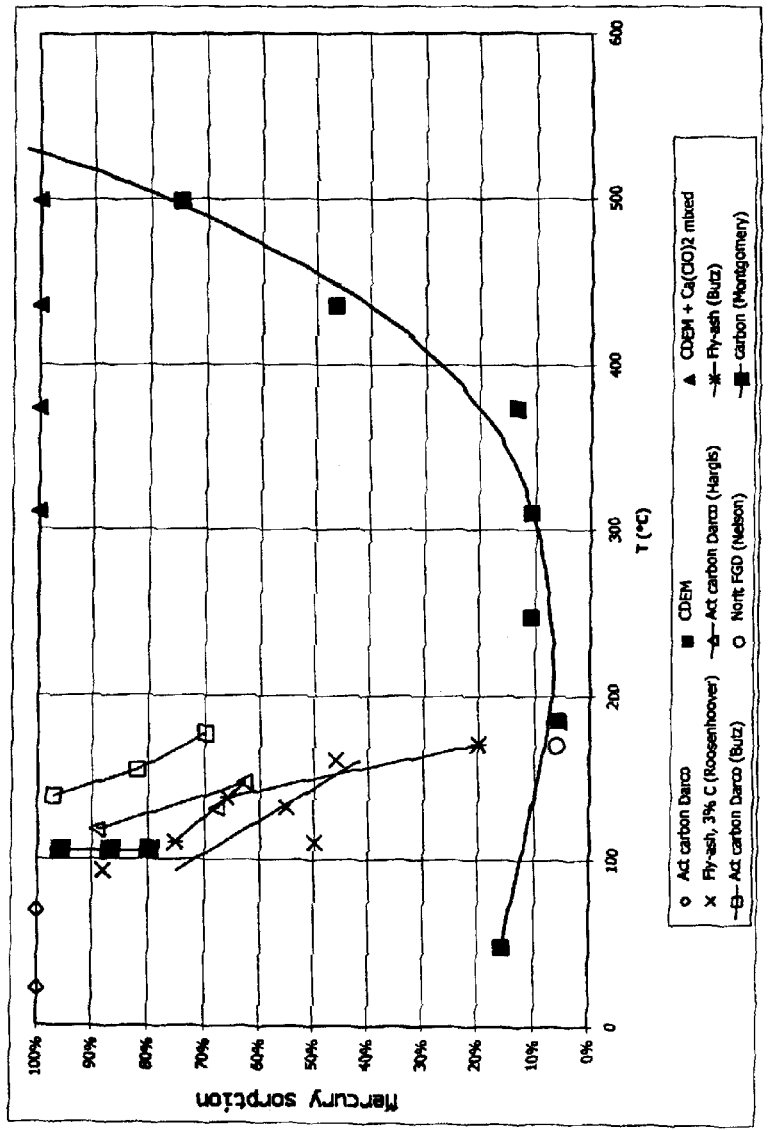
Figure 2: The activity of the sorbent according to the invention as function of the temperature, and compared with some of the prior art sorbents

METHOD FOR THE REMOVAL OF MERCURY FROM A GAS STREAM

The present invention relates to a method for the removal of mercury from a gas stream. The invention relates also to a sorbent comprising sorbed mercury. The invention also relates to a moulded object obtained with such a sorbent.

As already known, mercury is very harmful to the environment, even in low concentrations. Consequently, there is a need for a suitable method for removing mercury from a gas stream. Such methods are known in the art. In this respect it is important to discriminate between metallic mercury and ionogenic mercury. Both components are present in the gas stream from incineration processes involving mercury-containing materials.

In practice, the removal of metallic mercury from such a gas stream has been shown to be especially difficult. In particular for the removal of metallic mercury, the general practice is to use activated carbon, whereby the mercury is effectively adsorbed on the solid phase of the activated carbon. This known method, however, has a considerable drawback. In order to achieve acceptable removal percentages, it is necessary for the sorption on activated carbon to be carried out at a relatively low temperature. Especially if the gases to be cleaned have a high temperature, for example, if they originate from an incineration process, the gas must first be cooled before it is contacted with the activated carbon, allowing sorption to take place and finally, their temperature has to be raised again for a subsequent treatment or before discharge into the air. Naturally this requires much energy. For cooling purposes, water is sometimes injected into the gas stream, which may, moreover, give rise to corrosion problems. Another drawback is that the mercury-comprising carbon has to be disposed off to, in general, a controlled landfill site. Reuse of the material is hardly possible. A further additional drawback of the use of activated carbon is that the fly-ash from the incineration process are polluted with undesirable amounts of carbon, negatively influencing the quality of the fly-ash and seriously impeding the recycling of these polluted fly ashes in, for example, the cement industry.

A need therefore exists for an improved method for the removal of mercury, and preferably of metallic mercury, from gas streams. The characteristics particular to mercury are a complicating factor to this problem. At low temperatures it is liquid, it is very volatile and has a very low dew point.

It is a particular object of the invention to provide an improved method, by which mercury of both the ionogenic and the metallic type can be sorbed at high temperatures, for example, at a temperature above 170° C.

The temperature values mentioned below are temperature values that have been corrected with respect to the values mentioned in the priority document. The originally mentioned values were incorrect due to measurement deviations and where relevant, are placed in parenthesis below.

Preferably the temperature is higher than 230° C. [300], especially higher than 300° C. [500], more preferably higher than 450° C. [700], more preferably still higher than 550° C. [800]. The object of the invention is in particular to provide a method by which mercury can be sorbed in such a manner that the mercury-comprising sorbent is re-usable. The sorbent according to the invention is understood to be a solid substance.

It is also an object of the invention to provide a method by which mercury of both the ionogenic as well as the metallic type can be removed substantially completely from a gas stream.

In order to achieve at least one of the above-mentioned objectives, the invention provides a method as mentioned in the preamble, which is characterized in that at a temperature above 170° C., the gas stream is contacted with a sorbent that as the active component is comprised of a mixture of mainly silica-alumina compounds and/or calcium compounds.

According to a first preferred embodiment, the sorbent comprises kaolin, that may or may not be in the dehydrated form of meta-kaolin. According to a further preferred embodiment, the sorbent comprises calcium carbonate and/or calcium oxide. The calcium fraction of the sorbent typically consists of 60–70% of calcium carbonate and 40–30% of calcium oxide. The sorbent may also contain calcium hydroxide. The presence of calcium hydroxide does not improve the sorbent's efficiency further. Typically, the amount of $Ca(OH)_2$ is less than 10% by weight.

According to another preferred embodiment, the sorbent is obtained by the thermal conversion of a material chosen from 1. paper waste and 2. residue from the paper production.

By means of such a sorbent the mercury is sorbed chemically, so that in order to remove the mercury, the hot gas streams may be contacted with the sorbent without prior cooling. This results in a considerable saving of energy and has advantages with regard to the installation.

According to the invention, the temperature of the gas stream is at least 170° C., preferably at least 230° C. [300], especially at least 300° C. [500], more preferably at least 450° C. [700], still more preferably at least 550° C. [800]. Raising the temperature results in an improved sorption of the mercury.

By appropriately choosing the amount of sorbent, it becomes possible to reduce the mercury content in the gas stream to below the legal requirements.

In order to further improve the removal of mercury from a gas stream, the sorbent and/or the mercury-containing gas stream is contacted with an oxidator chosen from, for example, sulphate compounds, peroxide, and chlorine compounds. The oxidator is preferably a hypochlorite, for example, calcium hypochlorite ($Ca(ClO)_2$). The oxidator may be added to the sorbent prior to adding the sorbent to the gas stream to be scrubbed. Surprisingly, when the sorbent is heated together with the oxidator, the sorbent is shown to have an enhanced effect. This enhanced effect is maintained even after the remaining oxidator has been removed. In this manner, it is thus possible to produce a further improved sorbent.

The oxidator may be added to the sorbent prior to the introduction of the sorbent into the gas stream. The oxidator may also be added to the mercury-containing gas stream preceding the sorbent or at the position of the sorbent. Suitable oxidators already present in the flue gases from mercury-emitting incineration processes may have a similar improved effect, so that none or fewer of these compounds need to be added to the waste gas stream.

Reference is made to the German patent publication DE-A 4 339 777. This publication also discloses the use of an oxidator for the removal of mercury from a gas stream. The sorbent described in this publication consists of activated carbon or of a molecular sieve, which is treated with a mercury compound. According to the present invention, such a mercury-loaded pre-treatment is not required, which results in considerable savings and, of course, an improved mercury sorption capacity.

According to a working hypothesis used by the inventors, the functionality of the oxidator as added in accordance with the invention is not based exclusively on the oxidation of the mercury in the gas stream, but also on the preceding or in situ activation of the sorbent.

The mercury-comprising sorbent obtained after the sorption of mercury may be re-used, for example, for immobilisation or cementation involved in the production of e.g. form-retaining products. Applications may be found, among others, in road construction and the construction of public utilities. Of course, other applications are equally well possible. These applications are possible in particular due to the stable bond of the sorbed mercury in the loaded sorbent, which prevents the possibility of mercury leaching from the reused applications. The stable bond between mercury and the sorbent is characterized by the unexpectedly high temperature that is found to be required before the mercury is removed from the loaded sorbent.

Therefore, the invention also relates to a sorbent, comprising sorbed mercury, and obtained by the method according to the invention as mentioned above. The invention also relates to a moulded object produced with a sorbent that is obtained by a method according to the invention.

The invention will now be described in more detail with reference to an example.

A sorbent, obtained by thermal conversion from paper production residue is introduced into a waste gas stream comprising a known amount of mercury and also having a known temperature. The method of obtaining such a product is described in the Dutch Patent NL 1009870. In the example for the sorption of mercury with the aid of the above mentioned sorbent the temperature in the gas stream is varied from 50° C. to 500° C. [800]. The gas stream consists of nitrogen containing metallic mercury. In the various experiments a fixed sorption bed comprising the above mentioned sorbent was used. Both the ingoing and the outgoing mercury concentrations were measured by means of a commercially available "Buck analyzer". This device is exclusively suitable for determining metallic mercury. The concentration of ionogenic mercury was determined by, prior to measuring, leading the mercury-comprising gas through a bubbler containing stannouschloride. Stannouschloride is known to convert any ionogenic mercury that may be present into metallic mercury. In this way the total of both the metallic and ionogenic mercury is determined.

Table 1 shows the mercury concentration applied in the gas stream in the various experiments. The temperature indicated in Table 1 is the temperature at which mercury was removed with the aid of the sorbent. The percentage of captured mercury shown in Table 1 was calculated by dividing the difference between the ingoing mercury concentration and the outgoing mercury concentration by the ingoing mercury concentration. The mercury was fed to the gas stream at 100° C. by means of a Dynacal permeation tube, as known in the art. The nitrogen was preheated. Subsequently the mixed gas stream was heated to the temperature indicated in Table 1, after which it was lead through the sorption bed and subsequently to the analyser described above in order to measure whether any, and if so how much, mercury was still present in the gas stream.

The amounts of mercury used in the experiments are compatible with the sensitivity of the analyzer.

FIG. 1 shows a graphical illustration of the results obtained from the experiments. The decline in sorption at temperatures in the range from 50 to 230° C. [500] probably indicates an influence of physical sorption. The contribution of physical sorption decreases with rising temperatures, with the consequence that the total sorption also decreases. At higher temperatures the chemical sorption clearly dominates and the total sorption increases. It is observed that with the sorbent for mercury used in the art, activated carbon, there is also a negative trend in the total sorption at rising temperatures. At temperatures above approximately 200° C., sorption with activated carbon has decreased to a negligible value

TABLE 1

| Amount of Sorbent (grams) | T (° C.) | Mercury in inlet (ppm(vol)) | Mercury in outlet (ppm(vol)) | Mercury Captured (%) |
|---|---|---|---|---|
| 60 | 48 | 0.123 | 0.103 | 16 |
| 60 | 185 | 0.123 | 0.116 | 6 |
| 60 | 248 | 0.123 | 0.109 | 11 |
| 60 | 436 | 0.119 | 0.064 | 46 |
| 60 | 499 | 0.116 | 0.029 | 75 |

From Table 1 it can be seen that with an increase in temperature, the sorption of mercury by means of the sorbent according to the invention is enhanced.

The original uncorrected values were as follows:

| Amount of Sorbent (grams) | T (° C.) | Mercury in inlet (ppm(vol)) | Mercury in outlet (ppm(vol)) | Mercury Captured (%) |
|---|---|---|---|---|
| 60 | 50 | 0.0244 | 0.0154 | 37 |
| 60 | 300 | 0.0244 | 0.0165 | 32 |
| 60 | 500 | 0.0244 | 0.0178 | 27 |
| 60 | 700 | 0.0228 | 0.0050 | 78 |
| 60 | 800 | 0.0213 | 0.0014 | 93 |

FIG. 2 shows a graph of the activity of the sorbent according to the invention as a function of the temperature, and compared to some of the sorbents known in the prior art. The difference between the sorbent according to the invention and the group of other sorbents can clearly be seen, especially the difference in behaviour at elevated temperatures: at temperatures above 200° C. the sorbent according to the invention has a much improved sorption, while the known agents exhibit an increasingly reduced adsorption.

The foregoing Table 1 and the FIGS. 1 and 2 show that the sorption of mercury on the sorbent according to the invention is of the chemical type. This means in effect that the mercury is substantially irreversibly sorbed on the sorbent. Therefore, the chance of the mercury being removed from the sorbent after use of the sorbent, is negligible. This is confirmed by means of temperature-programmed dissociation measurements carried out on the mercury-loaded sorbents according to the present invention with the aid of thermogravimetrical and differential thermal analysis (TGA/DTA) under a flow of nitrogen gas coupled to a detection of mercury possibly removed from the sorbent in the gaseous form with the aid of the above mentioned "Buck" analyzer. From now on the TGA/DTA technique will be assumed to be known. More detailed information on this technique can be found, for example, in Brown, M. E., *Introduction to Thermal Analysis*, Kluwer Academic Publishers; ISBN 0412302306. These measurements show that up to temperatures of above 900° C., mercury is inseparably bound to the sorbent according to the present invention. Mercury is seen to be present in the off-gases of the TGA/DTA analyzer only at temperatures at which, by means of TGA/DTA analysis, the mineral structure of the sorbent can be seen to disintegrate. The consequence of the fact that the mercury binds this strongly to the sorbent according to the present invention is that the mercury-containing sorbent may be re-used, for example, for the manufacture of moulded products or mineral binders such as in cementation.

The sorption of mercury on the sorbent according to the invention may be further improved by adding a suitable amount of calcium hypochlorite to the sorbent prior to contacting the mercury with the sorbent. This may be achieved, for example, by introducing hypochlorite into the gas stream at a position upstream from the sorbent, for example, by placing the hypochlorite on the sorbent-comprising bed, when the mercury-comprising gas stream passes from the top through the bed. Experiments performed in this manner showed that at an equal amount of sorbent according to the invention, to wit 60 grams, the mercury removal was increased from approximately 11% to 100%, at 300° C. [500]. Other temperatures also produced removal percentages of 100%, as can be seen from the results shown in FIG. 2.

At such temperatures the hypochlorite will dissociate completely. It was shown, however, that an improved activity of the sorbent that was placed downstream of the hypochlorite was prolonged even after the hypochlorite had long since been completely dissociated, hypochlorite that had not reacted with the sorbent being removed from the experimental set-up by means of the gas stream. The absence of the hypochlorite after the completion of the experiment is confirmed by measuring with the aid of the TGA/DTA analysis and a coupled mass spectrometer whether any chlorine or chloride compounds of the sorbent used were present in the gases leaving the TGA/DTA characterization. The result of this measurement was that the amounts of any chlorine or chloride compounds were below the detection limit of the mass spectrometer. These measurements were verified by releasing chlorine with the aid of the so-called Gordinne basic fusion technique, after which the escaping chlorine was detected with the aid of photometric analysis. A more detailed description of this method can be found in ASTM C114. The result of this analysis which was carried out on two sorbents treated with hypochlorite was, that the chlorine content was below the detection limit of 100 ppm-weight, while the chlorine content of the initial calcium hypochlorite/sorbent mixture was more than 4% by weight, or 40,000 ppm-weight. It is concluded therefore, that the sorbent used no longer contains chlorine or chloride compounds. Since the activity enhanced by calcium hypochlorite (from 11% to 100% mercury adsorption at 300° C.) was maintained during the entire duration of the experiment, thus also after the chlorine was removed with the mercury-comprising gas stream, it is further concluded that the sorbent treated with the oxidator at elevated temperature possesses a permanently improved mercury-removing activity.

In the present cases an amount of 10 grams of calcium hypochlorite appeared to be sufficient.

The mercury-polluted gas stream may be contacted with the sorbent by placing the sorbent as fixed bed into the stream. The sorbent may optionally be dispersed in the gas stream. According to a first embodiment, the oxidator is added to the sorbent directly. According to a second embodiment, the oxidator may be added to the gas stream upstream from the sorbent, for example, by dispersing the same in the gas stream, and according to a third embodiment, an oxidator may be added to the gas stream simultaneously with the sorbent. The contacting time must in any case be such as to allow a desirable activation and sorption to take place. If the gas stream originates from, for example, an incineration plant, the above-mentioned substances may be added to the gas stream preceding a dust collector, so that the dust collector can remove the solid components from the gas stream all at the same time. The method according to the invention is also applicable to gases or vapors from the petrochemical and chemical industry, for example, for the removal of mercury from natural gases and natural gas condensate, from naphtha and other base materials used in the said industries.

According to a preferred embodiment, the sorbent may be added to a waste gas stream at various positions having different prevailing temperatures. This means that due to the choice of the location for adding a sorbent, different types of metal, irrespective of their condition (metallic or ionogenic), can be sorbed in a desirable condition. This condition depends on the temperature. Components such as $SO_2$, HCl and $Cl_2$ may also be removed with the aid of the method according to the invention.

The method according to the invention may be applied in an existing system where a cleaning apparatus for gas streams, for example a scrubber, is already present. Optionally only a small amount of sorbent may be added, just sufficient to convert the mercury in the gases into the ionic form ($Hg^{2+}$). This improves the mercury capturing performance in the scrubber.

The invention is not restricted to the above-described embodiment. Amounts of sorbent other than those mentioned above may be used in practice. Likewise, it is possible to use other kaolin-comprising sorbents.

The results of the measurements on prior art sorbents as indicated in FIG. 2, are retrieved from the following publications:

W. A. Rosenhoover et al., US ICCI project 98-1/1.2B-2

R. A. Hargis et al., US DOE; *Mercury control by injection of activated carbon,* 17th Int. Pittsburgh Coal Conf., 2000

J. R. Butz, C. Turchi, T. E. Broderick, J. Albiston, ADA techn, Littleton, *Options for mercury removal from coal fired flue gas streams, pilot scale research on activated carbon and alternative and regenerable sorbents,* 17th Int. Pittsburgh Coal Conf., 2000

Sid Nelson Jr., *High temperature sorbents to lower mercury control costs,* 17th Int. Pittsburgh Coal Conf., 2000

J. Montgomery, D. Battleson, S. Bryson, *Mercury removal from incineration offgas by carbon injection,* MSE technology applications Inc., Butte.

What is claimed is:

1. A method for the removal of mercury from a gas stream, characterized in that at a temperature above 230° C. the gas stream is contacted with a sorbent that as the active component is comprised of a mixture of substantially silica-alumina compounds and calcium compounds for the removal of mercury from the gas stream.

2. A method according to claim 1, characterized in that the sorbent comprises kaolin, that may or may not be in the dehydrated form of meta-kaolin.

3. A method according to claim 1, characterized in that the calcium compounds comprise calcium carbonate and/or calcium oxide.

4. A method according to claim 3, wherein the calcium compounds comprise 60–70% calcium carbonate and 40–30% calcium oxide.

5. A method according to claim 1, characterized in that the sorbent is obtained by thermal conversion of a material chosen from 1, paper waste and 2, residue from paper production.

6. A method according to claim 1, further comprising the step of activating the sorbent by means of an oxidator chosen from, sulphate compounds, peroxides or chloride compounds.

7. A method according to claim 6, characterized in that the activation of the sorbent and the oxidator is carried out prior to contacting the sorbent with the gas stream to be cleaned.

8. A method according to claim 7, characterized in that after activation of the sorbent, the oxidator is removed.

9. A method according to claim 6, characterized in that the oxidator and the sorbent are mixed together and are added to the gas stream to be cleaned as a mixture.

10. A method according to claim 6, characterized in that the oxidator is added earlier to the gas stream, upstream from the sorbent.

11. A method according to claim 6, characterized in that a chlorine compound is used as the oxidator.

12. A method according to claim 11, wherein calcium hypochlorite is used as the oxidator.

13. A method according to claim 6, characterized in that during sorption the temperature is higher than 50° C.

14. A method according to claim 13, wherein the temperature during sorption is higher than 400° C.

15. A method according to claim 1, characterized in that the mercury is present in the metallic form.

16. A sorbent, characterized in that it comprises mercury adsorbed thereto, obtained by a method according to claim 1.

17. A sorbent according to claim 16, characterized in that up to temperatures of more than 900° C. the mercury is irreversibly bound to the sorbent.

18. A binding agent using the mercury-comprising sorbent according to claim 16 as hydraulic or pozzolanic compound.

19. A molded product obtained by using a sorbent according to claim 16.

20. A method according to claim 1, wherein the temperature during sorption is higher than 550° C.

21. A method of improving a sorbent for the removal of mercury from a gas stream, characterized in that the same comprises steps of activating a compound comprised of a mixture of substantially silica-alumina compounds and calcium compounds, with an oxidator wherein the sorbent contacts a gas stream at a temperature above 230° C. for the removal of mercury from the gas stream.

* * * * *